United States Patent [19]

Noda

[11] Patent Number: 5,425,094

[45] Date of Patent: Jun. 13, 1995

[54] CROSS POINT SWITCH WITH POWER FAILURE MODE

[75] Inventor: Mitsuhiko Noda, Kyoto, Japan

[73] Assignee: Rohm Co., Ltd., Kyoto, Japan

[21] Appl. No.: 102,280

[22] Filed: Aug. 5, 1993

[30] Foreign Application Priority Data

Aug. 6, 1992 [JP] Japan .................. 4-210340

[51] Int. Cl.⁶ .......................................... H04M 19/00
[52] U.S. Cl. .................................. 379/292; 379/306;
379/307; 379/335
[58] Field of Search ................... 379/32, 33, 165, 179,
379/267, 279, 306, 307, 308, 335, 340, 370, 387,
413, 368, 94, 291, 292

[56] References Cited

U.S. PATENT DOCUMENTS

| | | | |
|---|---|---|---|
| 3,859,471 | 1/1975 | Danielsen et al. | 379/306 |
| 3,872,439 | 3/1975 | Salam | 379/306 |
| 4,327,255 | 4/1982 | Suszylo | 379/368 |
| 4,635,250 | 1/1987 | Georgiou | 379/306 |
| 4,635,288 | 1/1987 | Stadius | 381/119 |
| 5,081,668 | 1/1992 | Ito | 379/61 |
| 5,113,431 | 5/1992 | Horn | 379/94 |
| 5,220,597 | 6/1993 | Horiuchi | 379/368 |

FOREIGN PATENT DOCUMENTS 2916130  10/1979  Germany ............... 379/306

Primary Examiner—James L. Dwyer
Assistant Examiner—Scott Wolinsky
Attorney, Agent, or Firm—Fish & Richardson

[57] ABSTRACT

A cross point switch mounted on a telephone-related device such as a telephone. When an alternate power source request signal is low, switches are controlled in response to external data. When the signal is high, a predetermined switch or switches are forced to be turned on and other switches are forced to be turned off. As a supply voltage obtained from a commercial power supply drops, the request signal goes high. When the request signal is high, a voltage obtained from telephone line power is supplied only to necessary electric circuits. Only the most basic functions such as talking over a telephone line can be used such that power consumption can be minimized.

16 Claims, 5 Drawing Sheets

CROSS POINT SWITCH WITH POWER FAILURE MODE

CROSS-REFERENCE TO RELATED APPLICATION

This application is an application related to application U.S. Ser. No. 07/980,257 (corresponding to Japanese Patent Application No. Hei 3-312350) already assigned to the assignee of the present application. The contents of application U.S. Ser. No. 07/980,257 are substantially described in the specification of the present application and its accompanying drawing.

BACKGROUND OF THE INVENTION

1. Field of the Invention

This invention relates to a cross point switch mounted on a device such as a telephone.

2. Description of the Related Art

A cross point switch is mounted on a device such as a telephone. The cross point switch is a switch which enables connection of any desired one of input pins and any desired one of output pins, and has a configuration as shown in FIG. 5A, for example. This configuration is substantially the same as that disclosed in U.S. Ser. No. 980,257 previously proposed by the inventor.

The cross point switch 10 shown in FIG. 5A is formed as an 1C having 24 pins. The cross point switch 10 has 64 switches S1–S64 disposed so as to form an 8×8 switch matrix. Turning on/off of the switches S1–S64 is controlled by a 64-bit shift register 12 and a 64-bit data latch 14. Each of the switches S1–S64 consists of an analog switch 16 and a resistor 18 as shown in FIG. 5B.

Serial data DIN input through the 21st pin is shifted left one bit by the shift register 12 at the timing of a clock CLK input through the 22nd pin. The resultant 64-bit parallel data is latched by a latch signal LATCH input through the 23rd pin. The switches S1–S64 are turned on/off according to outputs of the data latch 14. For example, if the first bit of the data latch 14 is high, the switch S1 is turned on; if low, the switch S1 is turned off. A signal input through the 24th pin, RST, is a reset signal of the data latch 14.

The cross point switch 10 further includes eight input amplifiers 20-1 to 20-8, eight output amplifiers 22-1 to 22-8, and a bias circuit 24. Each of the input amplifiers 20-1 to 20-8 supplies corresponding one of signals IN1 to IN8 input through one of the fifth to twelfth pins via eight switches to the output amplifiers 22-1 to 22-8. For example, an output of the input amplifier 20-1 is supplied via switches S1, S9, S17, . . . , S57 to the output amplifiers 22-1, 22-2, 22-3, . . . , 22-8. The output amplifiers 22-1 to 22-8 output signals supplied via eight switches through the twentieth to thirteenth pins as signals OUT1 to OUT8. The bias circuit 24 receives supply voltage VCC through the second pin, then supplies bias voltage VB to the input amplifiers 20-1 to 20-8 and the output amplifiers 22-1 to 22-8 and also outputs the voltage VB through the third pin.

The switches S1 to S64 are turned on/off in response to data DIN, as described above. For example, if only the switch S1 is turned on and switches S9, S17, . . . , S57 are turned off, an output of the input amplifier 20-1 is input to the output amplifier 22-1, but not to the output amplifiers 22-2 to 22-8. Therefore, mounting the cross point switch 10 enables any desired signal to be supplied to any desired circuit in a device such as a telephone.

The output amplifiers 22-1 to 22-8 also have a mixing function. For example, if switches S1 and S2 are turned on, outputs of the input amplifiers 20-1 and 20-2 are mixed by the output amplifier 22-1 for outputting as signal OUT1. Further, since the input amplifiers 20-1 to 20-8 exist, even if a plurality of switches corresponding to a single output amplifier 22 are turned on at the same time, signal leakage via these switches does not occur.

However, the cross point switch having the above configuration introduces a problem of high consumption current because all circuits of input amplifiers, output amplifiers, etc., always operate. In other words, all circuits must be operated even for the minimum operation of connecting a handset of a radio controller of a telephone to a telephone line; high current required for the operation of all circuits must be supplied and the power efficiency of the circuitry becomes poor. This problem becomes remarkable particularly when a commercial power supply fails. To deal with high consumption current when the commercial power supply fails, since the telephone line power is not enough, a battery must be used, leading to necessity for mounting it on a device such as a telephone.

SUMMARY OF THE INVENTION

Accordingly, it is an object of the invention to eliminate the need for operating all circuits when the minimum operation of a device such as a telephone on which a cross point switch is mounted is performed at power failure.

It is another object of the invention to also eliminate the need for mounting a battery at the time.

To these ends, according to the invention, there is provided a cross point switch comprising:

a) N input pins where N is an integer of 2 or greater;

b) M output pins where M is an integer of 2 or greater;

c) a switch matrix for selectively connecting the N input pins and the M output pins; the switch matrix having N×M switches corresponding to combinations of the N input pins and the M output pins; and d) control means being responsive to external data for controlling the on or off state of each of the N×M switches; the control means being responsive to an input of a request signal for fixing a predetermined switch or switches of the N×M switches on and fixing the other switch or switches off.

In the invention, at the normal time, the switches are turned on or off in response to the external data. In contrast, when the request signal is generated, only the predetermined switch or switches are fixed on. Therefore, the request signal can be used to provide the minimum function (minimum connection).

For example, the request signal can be generated in response to power failure of a commercial power supply or restoration of power off. In this instance, the request signal can be said to be a signal indicating changing of power supplied to a power circuit from power obtained from the commercial power supply to line power or vice versa. The power circuit is a circuit for supplying to electric circuits disposed between the switches and input pins and/or output pins, such as input and output amplifiers, voltages required for the operation of the electric circuits, such as supply voltage and bias voltage. At the normal time, the power circuit operates with power supplied from the commercial power supply. When the request signal is input, the power circuit supplies voltages only to the electric circuit or circuits disposed between the switch or switches fixed on and the input pins and/or output pins.

In the configuration of this invention, when the commercial power supply is available, the switches making up the switch matrix are controlled in response to the external data; when the commercial power supply fails, only the predetermined switch or switches of the switch matrix are fixed on. Therefore, the switches related to the minimum function, such as connection of a handset of a radio controller and a telephone line if the device on which the cross point switch is mounted is a telephone, to be used at power failure can be fixed on. This eliminates the need for supplying power to the electric circuits not related to the switch or switches fixed on, leading to reduction of current required at power failure and elimination of a battery because of use of line power. That is, since the consumption current of the electric circuits to which a voltage is supplied at power failure is small, the power extracted from the telephone line, etc., is sufficient for the voltage supply at power failure, thus the minimum function of the device on which the cross point switch is mounted can be provided without mounting a battery.

The cross point switch of the invention can be mounted on various telephone-related devices such as a telephone. According to the invention, there is provided a telephone-related device comprising:

a) a cross point switch comprising:
- a2) N input pins where N is an integer of 2 or greater;
- a2) M output pins where M is an integer of 2 or greater;
- a3) a switch matrix for selectively connecting the N input pins and the M output pins; the switch matrix having N×M switches corresponding to combinations of the N input pins and the M output pins;
- a4) control means being responsive to external data for controlling an on or off state of each of the N×M switches; the control means being responsive to an input of an alternate power source request signal for fixing a predetermined switch or switches of the N×M switches on and fixing the other switch or switches off;
- a5) electric circuits disposed between the switches and the input pins and/or output pins; and
- a6) a power circuit for supplying voltage required for operation of the electric circuits to the electric circuits;

b) means for supplying DC voltage provided by rectifying commercial supply voltage to the power circuit as supply voltage thereof;

c) means for detecting a drop in the voltage; and d) means, upon detection of a drop in the voltage, for stopping the supply of the voltage provided by rectifying the commercial supply voltage and for supplying DC voltage obtained from a telephone line to the power circuit and the control means of the supply voltage and the request signal.

The control means can be made up of various logic circuits. For example, the control means comprises:

a) means for inputting the external data; the external data being serial data having N×M bits;
b) means for converting input external data into parallel data;
c) means for latching the parallel data; and
d) means responsive to values of bits of the latched parallel data for turning on or off switches corresponding thereto.

Serial-to-parallel conversion of the external data may be executed by using an N×M bit shift register which shifts the external data one bit at a time for storage. The latch means may be provided with a switch control function when the request signal is generated. That is, if the request signal is supplied, the contents of the parallel data at the latch means may be forced to be fixed to a predetermined value. At the time, if the latch means has N×M storage elements which are cascaded, the switch control function when the request signal is generated can be provided as a function which selectively sets or resets the contents of the storage elements.

BRIEF DESCRIPTION OF THE DRAWINGS

In the accompanying drawings:

FIG. 5A shows the configuration of the cross point switch and FIG. 5B shows the configuration of each switch element of the cross point switch.

DESCRIPTION OF THE PREFERRED EMBODIMENTS

Figures 5A, 5B:
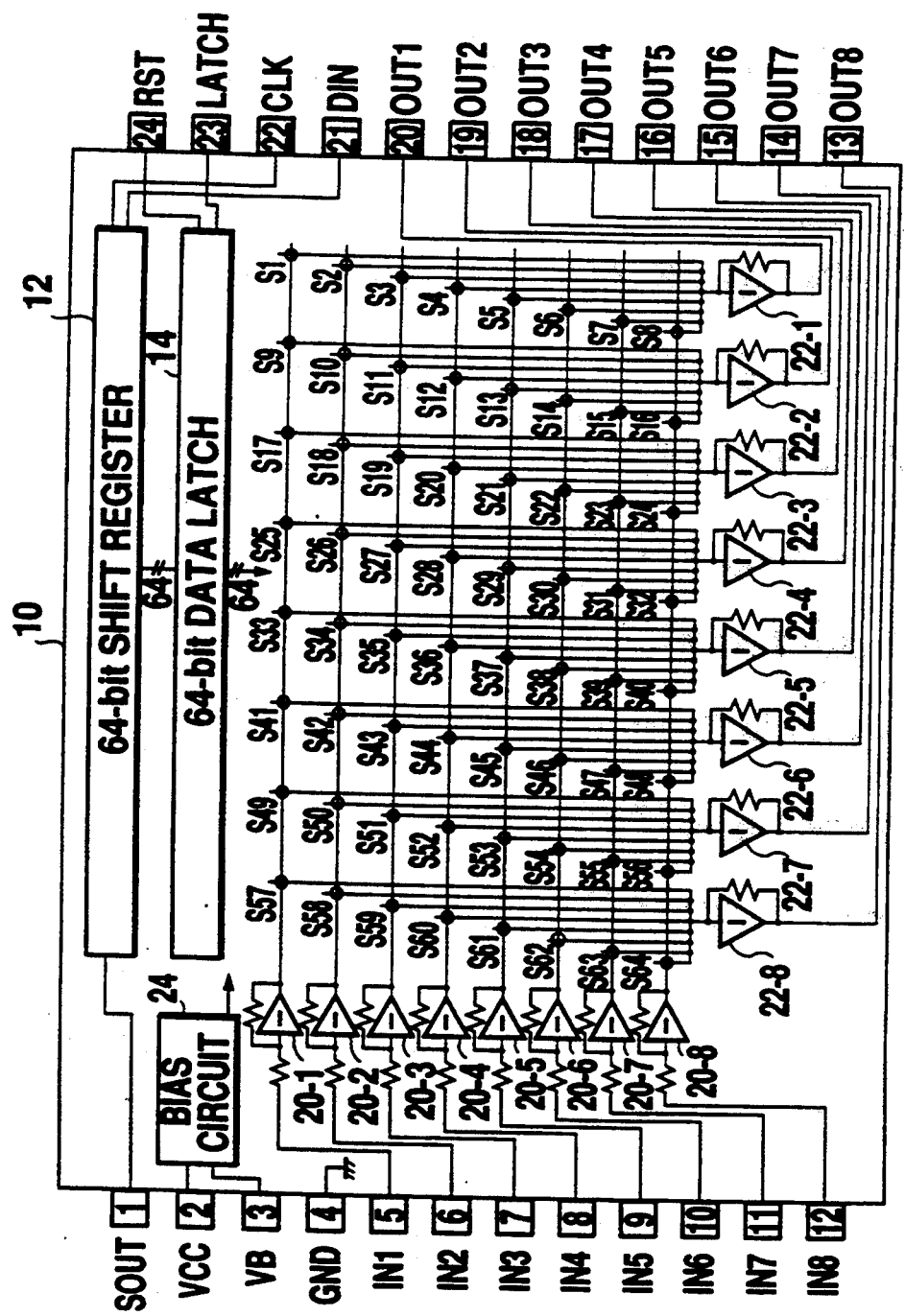
FIGS. 5A and 5B are diagrams showing the configuration of a cross point switch of the previous application made by the applicant.

Referring now to the accompanying drawings, there are shown preferred embodiments of the invention. Circuit parts identical with or similar to those of the configuration of the previous application shown in FIGS. 5A and 5B are denoted by the same reference numerals, and description is omitted.

Figure 1:
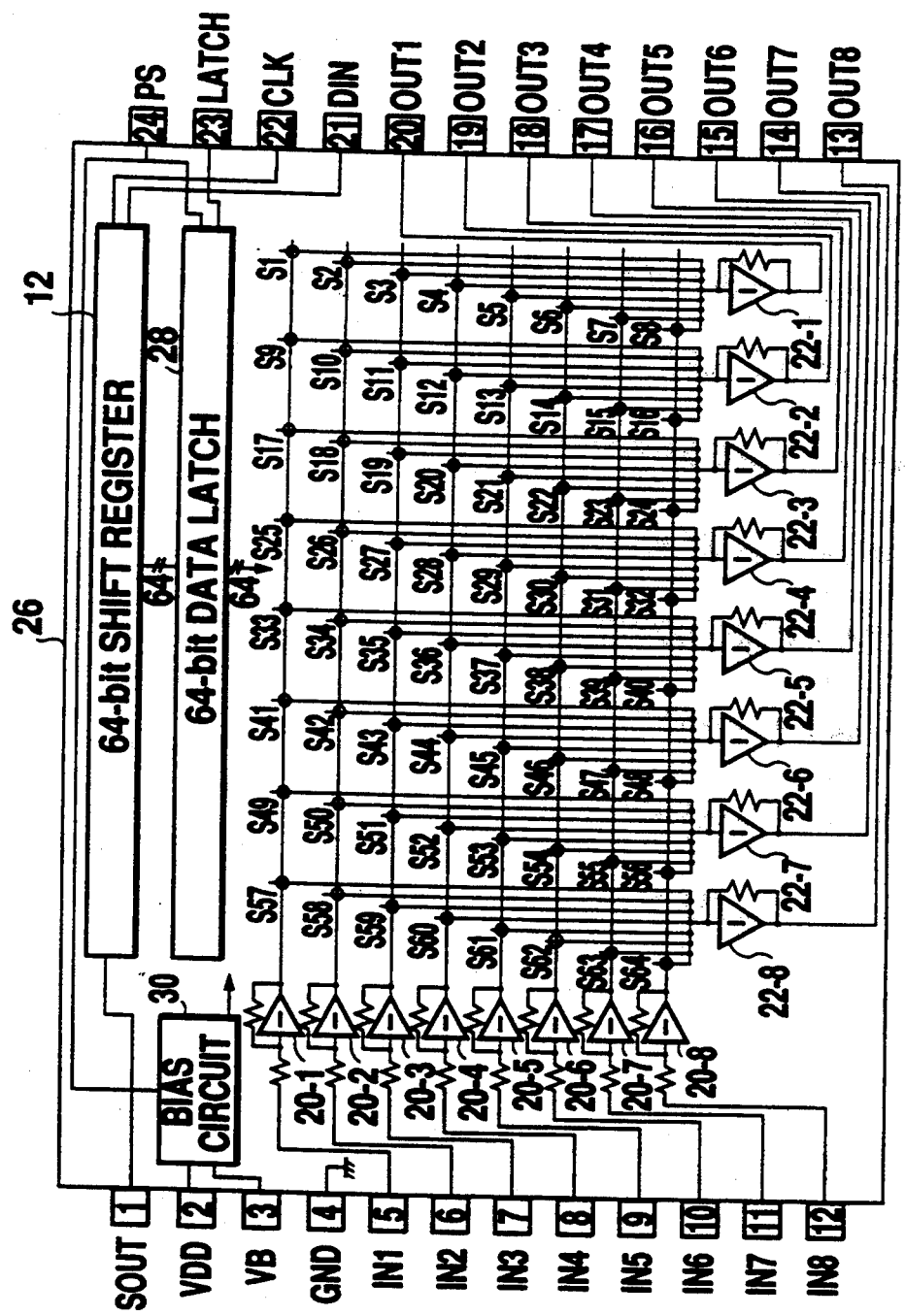
FIG. 1 is a block diagram showing the configuration of a cross point switch according to a first embodiment of the invention.

FIG. 1 shows the configuration of a cross point switch 26 according to a first embodiment of the invention. This embodiment differs greatly from the conventional embodiment in that a request signal for making the transition to operation at power failure, PS, is input through the 24th pin, that a 64-bit data latch 28 has a function of forcing output to be switched in response to the request signal PS, and that a bias circuit 30 moves to the operation of selectively supplying a voltage to each circuit in a cross point switch 26.

Figure 2:
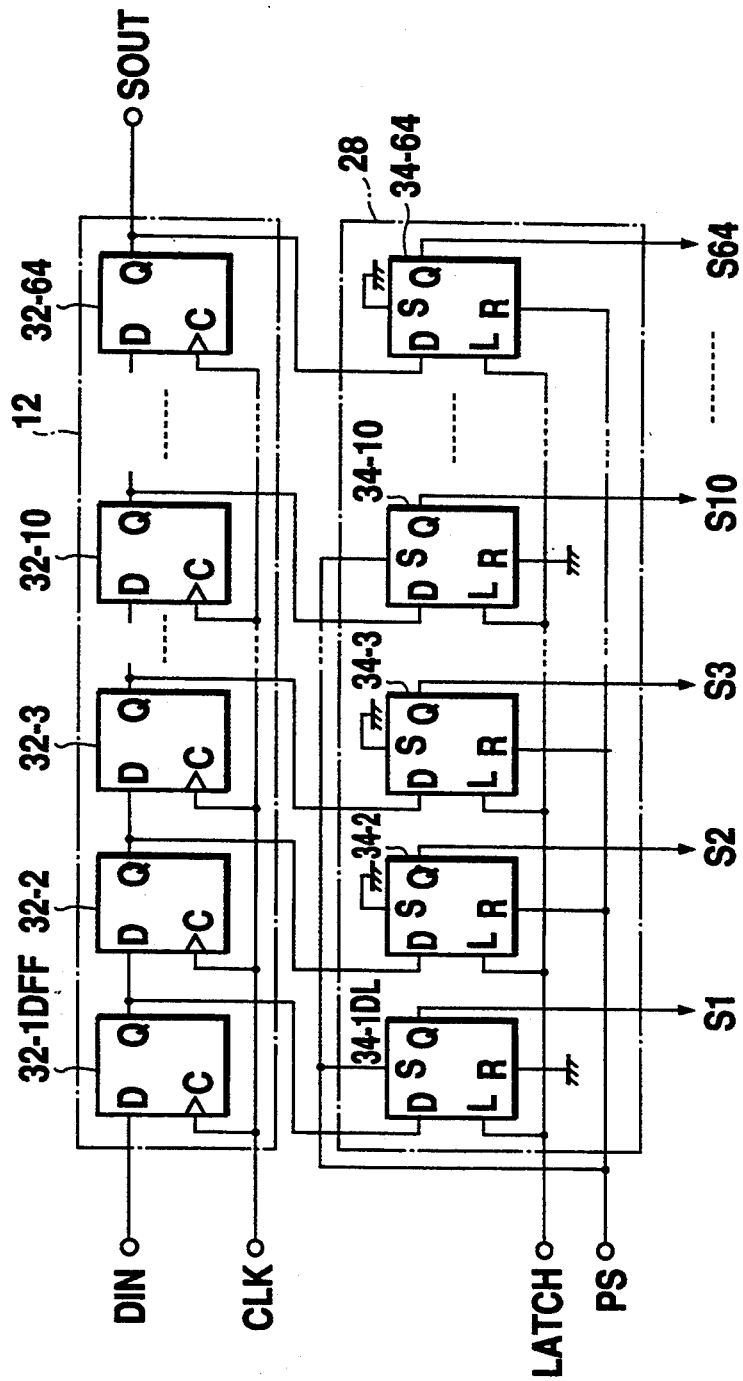
FIG. 2 is a block diagram showing the configuration of a shift register and data latch of the cross point switch according to the first embodiment of the invention.

FIG. 2 shows the internal configuration of a shift register 12 and a data latch 28 of the cross point switch 26 according to the first embodiment of the invention. As shown in the figure, the shift register 12 is made up of 64 D flip-flops (DFFs) 32-1 to 32-64 as many as 64 switches S1 to S64. The data latch 28 is made up of 64 latch elements (DLs) 34-1 to 34-64.

The DFFs 32-1 to 32-64 are cascaded in the subscript order. Data DIN is shifted from DFF 32-1 to 32-2 to 32-3 ... in order in response to a clock CLK. Q outputs of DFFs 32-1 to 32-64 are supplied to D inputs of DLs 34-1 to 34-64 respectively. When the request signal PS is low, DLs 34-1 to 34-64 latch the data in response to a latch signal LATCH. The data bits latched by DLs 34-1 to 34-64 are supplied to switches S1 to S64 respectively. That is, when the Q output of a DL 34-i (i=1,2, . . . 64) is high, the switch Si corresponding to the DL 34-i is turned on; when low, the corresponding switch Si is turned off.

With reference to FIG. 1, when the request signal PS is low, the bias circuit 30 supplies a supply voltage and bias voltage to all of eight input amplifiers 20-1 to 20-8 and eight output amplifiers 22-1 to 22-8.

Therefore, when the request signal PS is low, the signal paths from input amplifiers 20-1 to 20-8 via switches S1 to S64 to output amplifiers 22-1 to 22-8 are determined by the data latched by the data latch 28. Since the request signal PS is low when a commercial power supply does not fall as described below, the normal operation of the cross point switch according to the first embodiment becomes substantially the same as the operation of the cross point switch shown in FIG. 5A.

On the other hand, if the commercial power supply fails, the request signal PS goes high as described below. The request signal PS is supplied to S (set) inputs of the DL 34-1 corresponding to the switch S1 and the DL 34-10 corresponding to the switch S10 and R (reset) inputs of the DLs 34-2 to 34-9 and 34-11 to 34-64 corresponding to other switches. Therefore, if the request signal PS is high, the Q outputs of the DLs 34-1 and 34-10 go high and the Q outputs of other DLs 34-2 to 34-9 and 34-11 to 34-64 go low. Resultantly, when the commercial power supply fails, only the switches S1 and S10 are fixed on and other switches are fixed off.

With reference to FIG. 1, when the request signal PS is high, the bias circuit 30 supplies a supply voltage and bias voltage only to two of eight input amplifiers 20-1 to 20-8 and two of output amplifiers 22-1 to 22-8, namely, the input amplifiers 20-1 and 20-2 and the output amplifiers 22-1 and 22-2, and stops supplying the supply voltage and bias voltage to other input and output amplifiers 20-3 to 20-8 and 22-3 to 22-8.

Therefore, when the request signal PS is high, the signal paths from input amplifiers 20-1 to 20-8 via switches S1 to S64 to output amplifiers 22-1 to 22-8 are fixed to the signal path from input amplifier 20-1 via switch S1 to output amplifier 22-1 and the signal path from input amplifier 20-2 via switch S10 to output amplifier 22-2. Since the request signal PS is high when the commercial power supply fails as described below, the operation in the embodiment at power failure is performed with the signal paths thus fixed.

Figure 3:
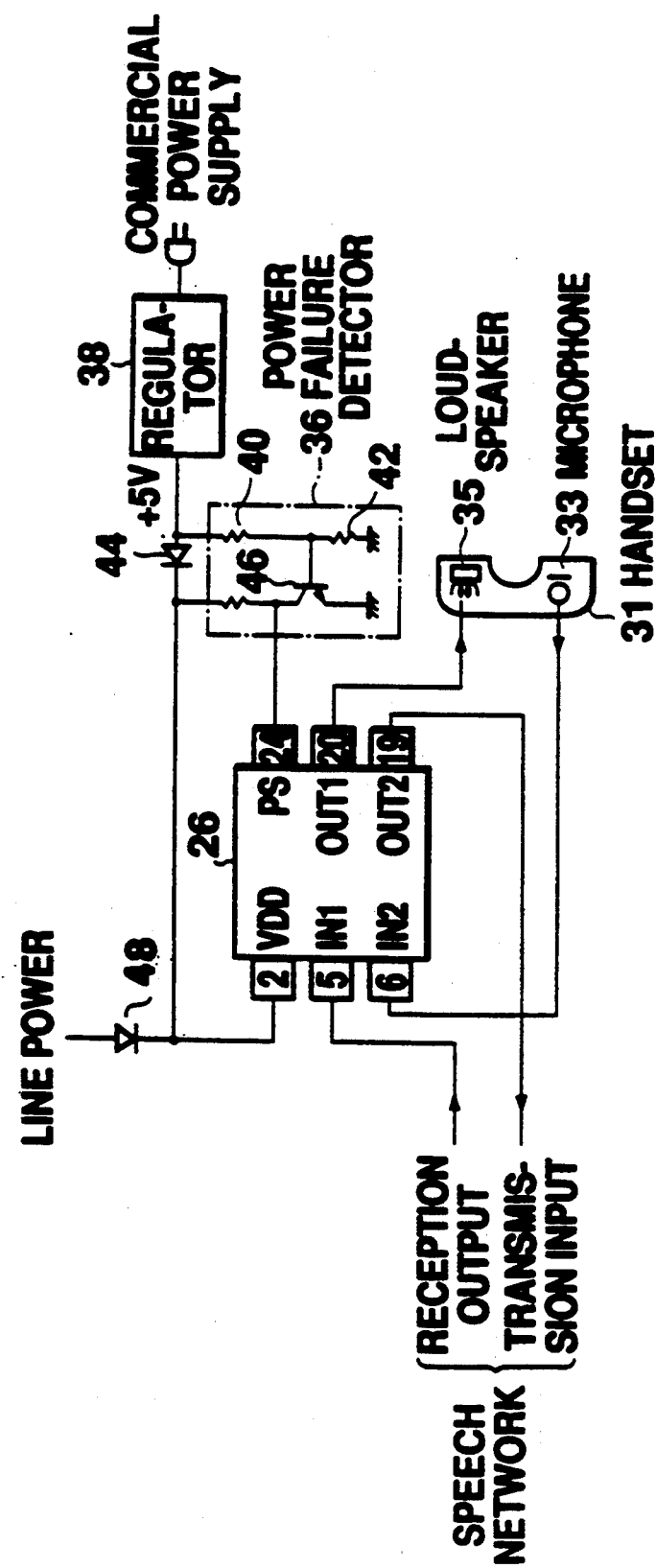
FIG. 3 is a block diagram showing an external connection example of the cross point switch according to the first embodiment of the invention.

FIG. 3 shows external connection of the cross point switch 26 according to the first embodiment. As described above, only two signal paths can be used at power failure in the embodiment. In the figure, the cross point switch 26 according to the embodiment is mounted on a telephone and at power failure, a handset 31 of a radio controller is connected via a speech network (not shown) to a telephone line. Reception output and transmission input terminals of the speech network are connected to the input pin (pin number 5) and output pin (pin number 19) related to one of the two signal paths that can be used at power failure, and a microphone 33 and a loudspeaker 35 of the handset 31 are connected to the input pin (pin number 6) and output pin (pin number 20) related to the other signal path. Thus, even when the commercial power supply fails, the handset 31 of the radio controller can be used for talking externally over the telephone line.

FIG. 3 also shows a power failure detector 36 which consists of resistors 40 and 42 connected to an output terminal of a regulator 38 for dividing, for example, +5 V output of the regulator 38 and a transistor 46 whose base voltage divided by the resistors 40 and 42 is applied to and whose collector is connected to the request signal PS pin (pin number 24) and a cathode of a diode 44. The regulator 38 rectifies and regulates a commercial supply voltage to generate a DC voltage of +5 V. The diode 44 is disposed between the output terminal of the regulator 38 and the VDD pin (pin number 2). On the other hand, a DC voltage extracted by a known technique from the telephone line is applied via a diode 48 to the VDD pin (pin number 2).

When an output of the regulator 38 does not drop, namely, when the commercial power supply does not fail, the transistor 46 is on, thus grounding the request signal PS pin (pin number 24) and the cathode of the diode 44. The request signal PS goes low and +5 V output of the regulator 38 is applied to the VDD pin (pin number 2) as supply voltage VDD. Therefore, in this case, the cross point switch 26 operates with the commercial supply power and the signal paths related to the switches S1 to S64 in the cross point switch 26 are controlled according to data DIN.

When an output of the regulator 38 drops, for example, if the commercial power supply fails, the transistor 46 and the diode 44 are turned off. Then, line voltage is applied via the diode 48 to the PS and VDD pins (pin numbers 24 and 2). That is, the request signal PS goes high and the line voltage is applied to the VDD pin (pin number 2) as supply voltage VDD. Therefore, in this case, the cross point switch 26 operates with the line power and the signal paths related to the switches S1 to S64 in the cross point switch 26 are fixed to the two signal paths described above.

Therefore, according to the embodiment, a power failure is detected and the request signal PS is generated and the supply voltage VDD source can be switched. Since consumption current in the cross point switch 26 at power failure is small, the handset 31 can be used for talking over the telephone line with the line power without a battery or the like.

Figure 4:
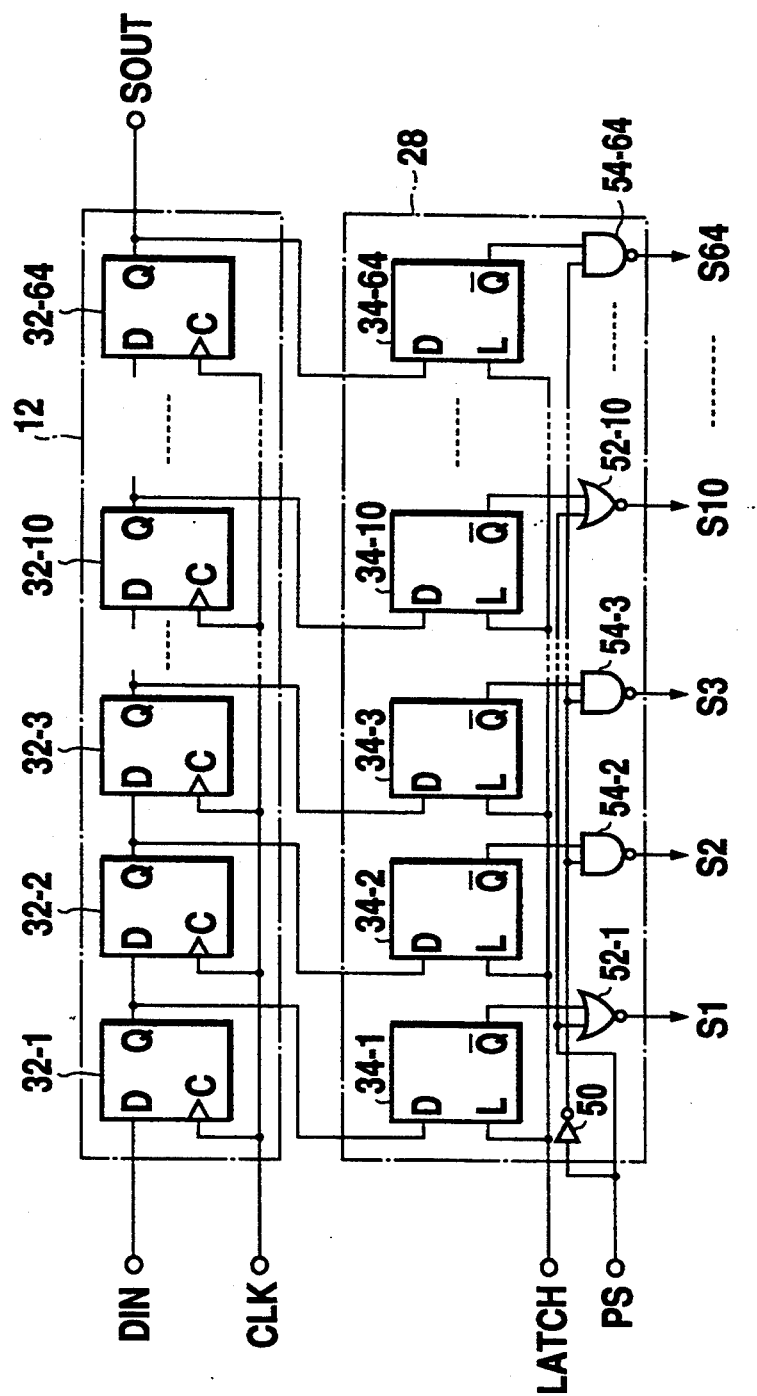
FIG. 4 is a block diagram showing the configuration of a shift register and data latch of a cross point switch according to a second embodiment of the invention.

FIG. 4 shows the configuration of a shift register 12 and data latch 28 of a cross point switch according to a second embodiment of the invention. In the second embodiment, a request signal PS as an S or R input is not supplied to DLs 34-1 to 34-64; instead, Q (−) outputs of DLs 34-1 to 34-64 are gated to generate control signals of switches S1 to S64.

Specifically, Q (−) outputs of DLs 34-1 and 34-10 corresponding to the switches S1 and S10 are supplied to NORs 52-1 and 52-10 together with the request signal PS, and the gate outputs are used to control the switches S1 and. S10. The request signal PS is inverted by an inverter 50, then Q (−) outputs of DLs 34-2 to 34-9 and 34-11 to 34-64 corresponding to the switches S2 to S9 and S11 to S64 are supplied to NANDs 54-2 to 54-9 and 54-11 to 54-64 together with the inversion value of the request signal PS, and the gate outputs are used to control the switches S2 to S9 and S11 to S64. Resultantly, the same effect as in the first embodiment is gained. In addition, since DLs 34-1 to 34-64 are not set/reset, the state at restoration of power off is restored to the same state as before power failure.

Although mounting the cross point switch 26 on a telephone has been discussed above, devices on which the cross point switch 26 are mounted are not limited to telephones. The scale of the cross point switch 26 may be other than the 8×8 switch matrix described above.

As described above, according to the invention, when the commercial power supply can be used, the switch matrix is controlled in response to the external data; when the commercial power supply fails, only predetermined switches of the switch matrix are fixed on. Only the switches related to the minimum function are fixed on and no power can be supplied to electric circuits not related to the switches, thereby reducing electric current required at power failure and eliminating the need for a battery.

According to the invention, when the commercial power supply can be used, a voltage required for operation is supplied to electric circuits disposed between switches and input pins and/or output pins; when the commercial power supply fails, a voltage is supplied only to the electric circuits related to the switches fixed on. If the consumption current of the electric circuits to which a voltage is supplied at power failure is small, the power extracted from the telephone line, etc., is sufficient for the voltage supply at power failure, thus the minimum function of a device on which the cross point switch is mounted can be provided without mounting a battery.

According to the invention, at the normal time, a DC voltage provided by rectifying the commercial supply voltage is used as supply voltage of the cross point switch; when the commercial power supply fails, a DC voltage obtained from the telephone line is used. Further, the supply voltage, when the commercial power supply fails, is also used as a request signal indicating a move to operation at power failure. Thus, the operation at power failure can be executed suitably.

What is claimed is:

1. A cross point switch comprising:
   N input pins where N is an integer having a value of 2 or greater;
   M output pins where M is an integer having a value of 2 or greater;
   a switch matrix for selectively connecting said N input pins and said M output pins; said switch matrix having N×M switches corresponding to combinations of said N input pins and said M output pins; and
   control means being responsive to external data for controlling an on or off state of each of said N×M switches; said control means being responsive to an input of an alternate power source request signal for fixing at least two predetermined switches of said N×M switches on and fixing the other switches off.

2. The cross point switch as claimed in claim 1, further comprising electric circuits disposed between said switches and at least one of said input pins and said output pins.

3. The cross point switch as claimed in claim 2, further comprising a power circuit for providing required supply voltage to said electric circuits.

4. The cross point switch as claimed in claim 3 wherein said power circuit operates with power supplied from a commercial power supply.

5. The cross point switch as claimed in claim 4, wherein, when said request signal is input, said power circuit supplies voltage only to the electric circuit or circuits disposed between said switch or switches fixed on and at least one of said input pins and said output pins.

6. The cross point switch as claimed in claim 5, wherein said request signal is a signal indicating changing of the power supplied to said power circuit, wherein the change of power supplied is from power obtained from the commercial power supply to telephone line power.

7. The cross point switch as claimed in claim 6, wherein said request signal is generated in response to at least one of a power failure of the commercial power supply and restoration of power off.

8. The cross point switch as claimed in claim 1 wherein said control means comprises:
   means for inputting said external data; said external data being serial data having N×M bits;
   means for converting input external data into parallel data;
   means for latching said parallel data; and
   means being responsive to values of bits of said latched parallel data for turning on or off switches corresponding thereto.

9. The cross point switch as claimed in claim 8 wherein said conversion means is an N×M bit shift register which shifts said external data one bit at a time for storage.

10. The cross point switch as claimed in claim 8 further including means for forcing contents of the parallel data at said latch means to be fixed to a predetermined value if the request signal is supplied.

11. The cross point switch as claimed in claim 10 wherein said latch means has N×M storage elements which are cascaded; and said fixing means selectively sets or resets contents of said storage elements.

12. The cross point switch as claimed in claim 1 wherein said cross point switch is an integrated circuit.

13. The cross point switch as claimed in claim 1, further comprising:
   an input amplifier connected between each of said input pins and said switch matrix, and
   an output amplifier connected between said switch matrix and each of said output pins,
   said input and said output amplifiers for providing a mono-directional signal path.

14. A telephone-related apparatus comprising:
   a cross point switch comprising:
   N input pins where N is an integer having a value of 2 or greater;
   M output pins where M is an integer having a value of 2 or greater;
   a switch matrix for selectively connecting said N input pins and said M output pins; said switch matrix having N×M switches corresponding to combinations of said N input pins and said M output pins;
   control means being responsive to external data for controlling an on or off state of each of said N×M switches; said control means being responsive to an input of an alternate power source request signal for fixing at least two predetermined switches of said N×M switches on and fixing the other switch or switches off;
   electric circuits disposed between said switches and at least one of said input pins and said output pins; and
   a power circuit for providing required supply voltage to said electric circuits, said power circuit comprising:
   means for rectifying commercial supply voltage to DC voltage;

means for detecting a drop in said DC voltage; and means, upon detection of a drop in said DC voltage supplied from said power circuit, for stopping the supply of said DC voltage and for using power extracted from a telephone line to provide an alternate source of supply voltage to said electric circuits and to provide said request signal to said control means.

15. The apparatus as claimed in claim 14, wherein said electric circuits in said cross point switch further comprise:

an input amplifier connected between each of said input pins and said switch matrix, and an output amplifier connected between said switch matrix and each of said output pins, said input and said output amplifiers provide a monodirectional signal path.

16. A cross point switch comprising:

N input pins where N is an integer having a value of 2 or greater;

M output pins where M is an integer having a value of 2 or greater;

a switch matrix for selectively connecting said N input pins and said M output pins, said switch matrix having $N \times M$ switches corresponding to combinations of said N input pins and said M output pins; and control means being responsive to external data for simultaneously controlling an on or off state of each of said $N \times M$ switches, said control means being responsive to an input of an alternate power source request signal for fixing predetermined switches of said $N \times M$ switches on and fixing the other switches off.

* * * * *